United States Patent [19]

Hansen et al.

[11] Patent Number: 4,641,537
[45] Date of Patent: Feb. 10, 1987

[54] ELECTROMAGNETIC FLOW METER

[75] Inventors: Henning M. Hansen; Hans E. Jacobsen, both of Nordborg; Henry Hansen, Gråsten; Konstantin Lassithiotakis, Langeskov; Allan S. Pedersen; John Nyrup, both of Sønderborg, all of Denmark

[73] Assignee: Danfoss A/S, Nordborg, Denmark

[21] Appl. No.: 819,383

[22] Filed: Jan. 16, 1986

[30] Foreign Application Priority Data
Jan. 21, 1985 [DE] Fed. Rep. of Germany ....... 3501768

[51] Int. Cl.⁴ .............................................. G01F 1/58
[52] U.S. Cl. .................................................. 73/861.12
[58] Field of Search ......................... 73/861.11, 861.12

[56] References Cited
U.S. PATENT DOCUMENTS

| | | | |
|---|---|---|---|
| 3,446,071 | 5/1969 | Kolin et al. | 73/861.12 |
| 3,827,298 | 8/1974 | Kawamata et al. | 73/861.12 |
| 4,281,552 | 8/1981 | Nissen et al. | 73/861.12 |
| 4,497,212 | 2/1985 | Schmoock | 73/861.12 |

Primary Examiner—Charles A. Ruehl
Attorney, Agent, or Firm—Wayne B. Easton

[57] ABSTRACT

The invention relates to an electromagnetic flow meter of the type having a cylindrically shaped tube section with two magnetic poles each having a core section carrying a winding attached to the outside and on opposite sides of the tube section. Smaller dimensions and lower losses in the magnetic circuit are achieved by providing a casing or yoke unit formed of sheet metal members and having U-shaped core sections. The core sections have central webs adapted to the curvature of the pole shoes and rectangular coils are disposed respectively between the associated pole shoes and sheet metal yoke members.

8 Claims, 4 Drawing Figures

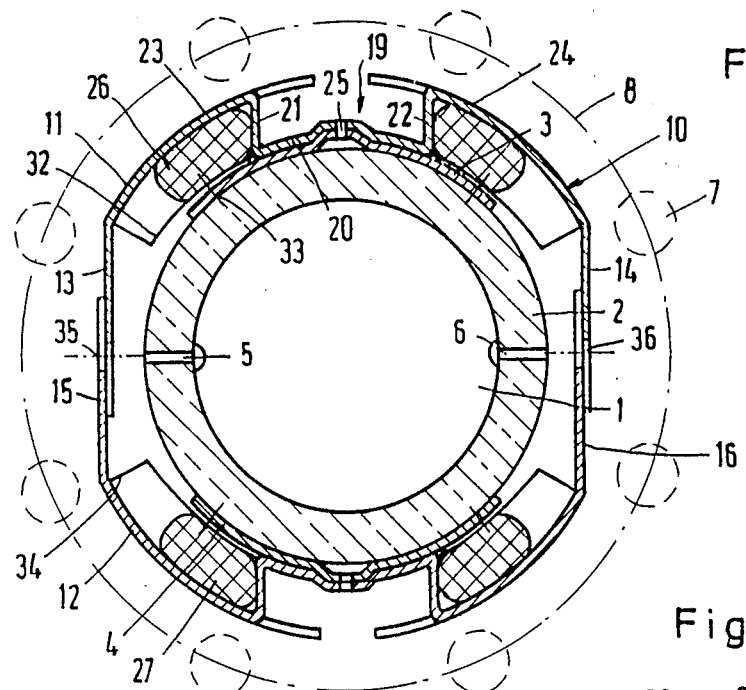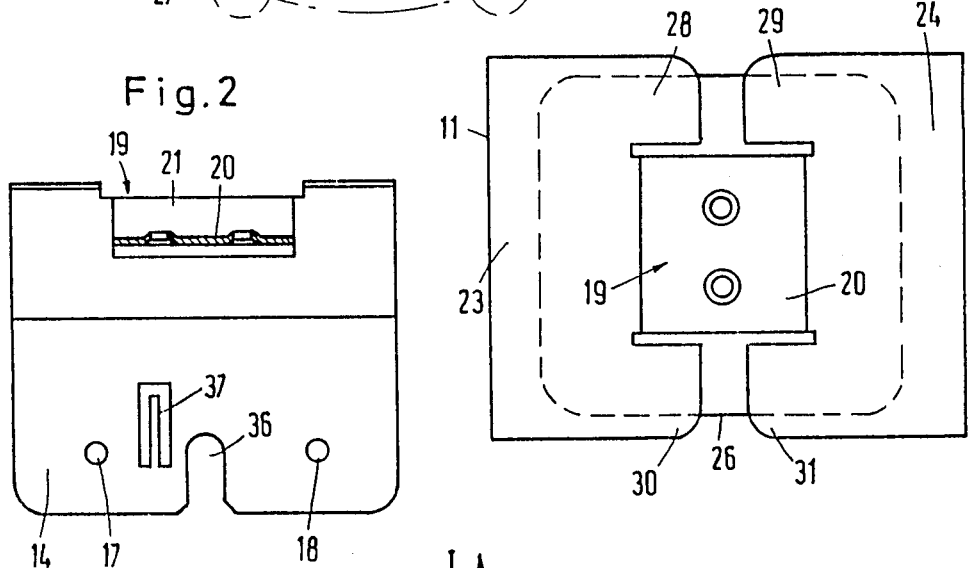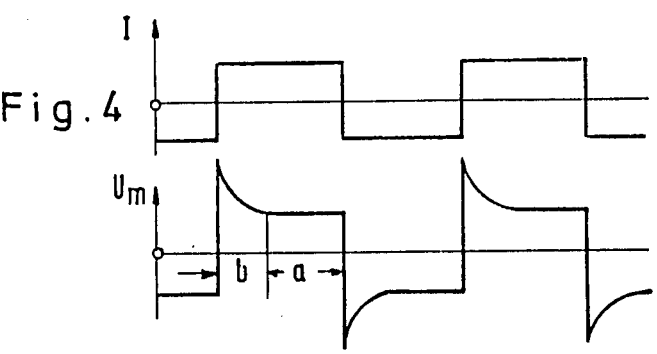

4,641,537

ELECTROMAGNETIC FLOW METER

The invention relates to an electromagnetic flow meter in which the magnetic system consists of two magnetic poles which can be placed on a measuring tube from the outside and each have a core section carrying a winding and, secured thereto, a pole shoe adapted to the curvature of the measuring tube, and an outer yoke of such a shape that the axial screws for clamping the measuring tube extend outside the yoke.

In a known electromagnetic flow meter of this kind (DE-OS 32 25 22 6, FIG. 28a), the measuring tube which is provided with an internal insulating layer consists of non-magnetic metal and has a thin wall thickness. By using the pole shoes, one obtains a favourable field distribution in the measuring tube. The predominant part of the housing is disposed within the axial screw circle which is standardised according to the diameter of the tubing. To accommodate the windings, the housing is enlarged radially outwardly at opposite sides and projects outwardly between each two axial screws. This leads to comparatively large dimensions. In addition, there are high losses in the magnetic circuit. The invention is based on the problem of providing an electromagnetic flow meter of the aforementioned kind with smaller dimensions and lower losses in the magnetic circuit.

This problem is solved according to the invention in that the yoke consists of at least one sheet metal member, that the core sections are U-shaped sheet metal members of which the central web is adapted to the curvature of the pole shoe which is likewise of sheet metal and the outer ends of the limbs are in one piece with the adjoining yoke section, and that the windings are substantially rectangular curved flat coils of which the sides are circumferentially offset and are disposed between the associated pole shoe and a yoke section extending within the axial screw circle.

By using sheet metal members for the yoke and the core sections, the amount of iron is reduced to a bare minimum. Consequently, the eddy current losses are extraordinarily low. Further, the path in the iron is comparatively short because its radial extent in the zone of the windings is restricted to the low height of the core sections. Since the circumferential extent of the core section is not limited by the axial screws, there is a comparatively large contact face between the central web of the U-shaped bent sheet metal member and the associated pole shoe. All this permits the number of windings to be considerably reduced. In the form of flat coils, the windings can therefore be readily arranged so that the entire housing of the flow meter extends within the axial screw circle. The thin wall thickness of the sheet metal member contributes to this. One can even use ceramic measuring tubes of such a wall thickness that they will withstand the forces occurring during operation, particularly the axial clamping forces. In addition, the amount of self-induction is lower, which leads to shorter decay periods in the voltage peaks of the measuring signal occurring in the windings after the usual switching over of the direction of the direct current, thereby increasing the part of the measuring period during which pseudo-stationary conditions exist. Further, the device is cheap because it is made from sheet metal. The construction of the device is suitable for a large variety of different measuring tube diameters, it being possible to use flat coils having the same electrical parameters and therefore the same evaluating circuit.

Preferably, the core section extends through an angle of about 40 to 50 degrees. This leads to the desired large contact surface between the pole shoe and the core section so that the remaining air gap will now have a strong influence on the magnetic circuit.

The pole shoe should itself extend through an angle of about 90 degrees. This circumferential extent substantially corresponds with that of the winding so that the latter is securely held between the pole shoe and the yoke. In addition, a pole shoe of these dimensions results in a field within the measuring tube that is favourable for the measurement.

The sheet metal is preferably about 1 mm thick. Having regard to the width of the sheet metal, this thickness is sufficient for the magnetic flux but the eddy current losses are extremely low.

Further, the limbs of the U-shaped sheet metal member should have a height of only 6 to 12 mm. The radial extent by which the yoke projects beyond the measuring tube is correspondingly low and the magnetic path is correspondingly short.

Preferably, the yoke consists of two substantially identical sheet metal members which carry the core section centrally and are interconnected at least at one of their overlapping ends. At the point of overlap, there is a large surface so that the unavoidable air gap will not strongly influence the magnetic circuit.

In particular, the ends of the two sheet metal members are planar and parallel.

In another embodiment, the sheet metal member is wider than the U-shaped sheet metal member. The marginal zones will then serve for magnetic screening.

In particular, the sheet metal member may carry lugs at both sides of the U-shaped bent sheet metal member, the lugs externally overlapping the sides of the flat coil that are axially offset. The screening therefore extends substantially over the entire range of the winding. These lugs can be very readily manufactured during stamping and bending of the sheet metal member.

The central web of the U-shaped bent sheet metal member preferably has a substantially square surface. This leads to the largest possible contact area with the pole shoe for the shortest possible circumferential length.

It is recommended that the flat coils have about one thousand windings and an ohmic resistance of about 50 ohm. One can standardise the coils to these values for different sizes of measuring tube so that a unitary evaluating circuit would be suitable for different conduit diameters.

In another embodiment, the sheet metal of the pole shoe may carry screening of electrically conductive and magnetically non-conductive material which overlaps the inside of the flat coil. The winding is therefore completely surrounded by earthed components. In particular, the screening may be a copper sheet.

Fastening of the sheet metal members to each other is preferably by way of rivets. This gives a very cheap assembly.

A preferred example of the invention will now be described in more detail with reference to the drawing, in which:

FIG. 1 is a cross-section through a flow meter according to the invention,

FIG. 2 is an end elevation of one of the two sheet metal members,

FIG. 3 is a plan view of the upper sheet metal member and

FIG. 4 shows the winding current I against the measuring voltage $U_m$.

The electromagnetic flow meter shown in FIG. 1 serves to determine the quantity of flow in the internal cross-section 1 of a measuring tube 2 which is here of ceramic material. For this reason, a magnetic field is produced in the measuring tube 2 with the aid of two pole shoes 3 and 4. At two diametrically opposite measuring electrodes 5 and 6 disposed in the symmetrical plane, one can then derive a measuring voltage $U_m$ which is proportional to the amount of flow. The ends of the measuring tube 2 lie between the flanges of two tubes. These flanges are clamped together with the aid of axial screws 7 disposed on an axial screw circle 8. The diameter of this circle and the number of screws arranged thereon are standardised depending on the nominal diameter.

The housing 10 of the flow meter is disposed entirely within the space left by the screws 7. It consists of two sheet metal members 11 and 12 which are interconnected along their parallel ends 13 to 16 by means of rivets 17, 18 to result in an overlap of large area. At the middle of each sheet metal member there is a sheet metal core section 19 having a central web extending over about 40° to 50° and two limbs 21 and 22 with a height of 6 to 12 mm. The latter are made in one piece with the adjoining bent yoke sections 23 or 24 of the corresponding sheet metal member 11. The central web 20 has the same curvature as the associated pole shoe 3 which, in turn, extends through about 90° and is adapted to the outer circumference of the measuring tube 2. The interconnection between the pole shoe 3 and central web 20 is by way of rivets 25. Contact is over a large substantially square area. Between the respective yoke sections 23 and 24 and the projecting parts of the pole shoe 3 there is a winding in the form of a flat coil 26 or 27. These flat coils each have about 1,000 windings and an ohmic resistance of about 50 ohm. Their axially offset sides are overlapped by lugs 28 to 31. The sheet metal member 11 is therefore axially wider than the U-shaped bent sheet metal member 19. The sheet metal member 11 is first stamped and subsequently bent to the desired shape.

Screening 32 in the form of a copper sheet is held to the outside of each pole shoe 3. The fastening can be by way of spot welding as shown. A corresponding copper sheet 34 is associated with the other coil 27. The flats coils are therefore entirely surrounded by earthed components. The connections of the electrodes 5 and 6 can be led outwardly through lateral apertures 35 and 36 in the housing 10. A further stamped opening produces an earthing terminal 37.

In operation, the windings are fed with a current I which, as is shown in FIG. 4, has its direction reversed at predetermined time intervals of, for example, 120 ms. After each reversal, the measuring voltage $U_m$ starts with a peak which generally decays so that the actual measurement can take place only a certain time after switching over, that is to say, within the period a. The preceeding decay period b is comparatively short for the flow meter here in question so that, with a given switching period, a comparatively long measuring period a is available. This is achieved because the self-induction of the flat coils 26 and 27 is low by reason of the small number of windings. The small number of windings is possible because the magnetic return circuit consists of the bare minimum of iron and therefore only small eddy current losses arise because the radially extending parts of this return circuit are short and because all surfaces where an air gap would occur are formed by large areas of overlap. Since the housing 10 lies completely within the axial screw circuit 8, no regard need be had to the gap between adjacent axial screws. One obtains a small and handy device which can be economically produced.

What is claimed is:

1. An electromagnetic flow meter, comprising, a cylindrically shaped tube section, two magnetic poles each having a core section carrying a winding attached to the outside of and on diametrically opposite sides of said tube section, each of said poles having a pole shoe curved to fit the curvature of said tube section, two outer yoke members formed of sheet metal and having casing portions thereof in surrounding relation to said tube section, each said yoke member being formed with a U-shaped section to form said core section having legs which join the corresponding one of said casing portions and which includes a central web section in abutting engagement with the corresponding one of said pole shoes, and each said winding having substantially rectangular coils disposed between the corresponding one of said pole shoes and the corresponding ones of said outer yoke member casing portions.

2. A flow meter according to claim 1 characterized in that each said pole shoe extends over an angle of about 90°.

3. A flow meter according to claim 1 characterized in that said sheet metal has a thickness of about 1 mm.

4. A flow meter according to claim 1 characterized in that said core section legs have a height of 6 to 12 mm.

5. A flow meter according to claim 1 characterized in that said outer yoke members are two substantially like sheet metal members which have overlapping ends which are connected.

6. A flow meter according to claim 5 characterized in that said overlapping ends of said sheet metal members are planar and parallel.

7. A flow meter according to claim 5 characterized in that said sheet metal members have lugs which circumferentially overlap said core sections.

8. A flow meter according to claim 1 characterized in that said central web section has a substantially square surface.

* * * * *